(12) United States Patent
Givati et al.

(10) Patent No.: US 10,283,875 B2
(45) Date of Patent: May 7, 2019

(54) MOBILE ACTIVE AND ADAPTIVE ANTENNA ARRAYS

(71) Applicant: GM Global Technology Operations LLC, Detroit, MI (US)

(72) Inventors: Ofer Givati, Herzliya (IL); Igal Kotzer, Tel-Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 15/653,919

(22) Filed: Jul. 19, 2017

(65) Prior Publication Data
US 2019/0027834 A1    Jan. 24, 2019

(51) Int. Cl.
*H01Q 21/00* (2006.01)

(52) U.S. Cl.
CPC ..... *H01Q 21/0087* (2013.01); *H01Q 21/0025* (2013.01)

(58) Field of Classification Search
CPC ...................................................... H01Q 21/00
USPC .......................................................... 343/713
See application file for complete search history.

(56) References Cited

U.S. PATENT DOCUMENTS

2005/0280372 A1* 12/2005 Anderson .............. H01Q 1/366
                                                                  315/111.21
2008/0267635 A1* 10/2008 Kawamoto .......... H04B 10/548
                                                                  398/141

* cited by examiner

*Primary Examiner* — Andrea Lindgren Baltzell
(74) *Attorney, Agent, or Firm* — Cantor Colburn LLP

(57) ABSTRACT

A system and method to control active and adaptive antenna arrays processes information to determine one or more areas of interest for subsequent transmission. The method includes selecting one or more antennas among a set of available antennas in different locations of a vehicle to perform the subsequent transmission. Each of the one or more antennas includes one or more antenna elements. The method also includes assigning a magnitude and phase for the subsequent transmission by each of the one or more antenna elements of each of the one or more antennas.

20 Claims, 4 Drawing Sheets

MOBILE ACTIVE AND ADAPTIVE ANTENNA ARRAYS

INTRODUCTION

The subject disclosure relates to mobile active and adaptive antenna arrays.

Vehicles (e.g., automobiles, farm equipment, construction equipment, automated factory equipment) may include sensors to obtain a variety of information to aid in the operation and maintenance. Exemplary sensors include wheel speed sensors (WSS) and inertial measurement unit (IMU) to obtain information about vehicle operation, as well as cameras, lidar, and radar systems to obtain information about vehicle surroundings. Certain systems, such as the radar system or cellular communication system, may be associated with multiple antennas in multiple locations of the vehicle to obtain information from all around the vehicle. Each antenna may include one or more antenna elements and has a corresponding three-dimensional (3D) radiation pattern. Uncorrelated patterns of two or more antennas may be used to add gain to the system according to a multi-input multi-output (MIMO) scheme. Uncorrelated refers to the fact that each of the antennas or each of the antenna arrays (i.e., set of two or more antenna elements) directs energy to different regions in space or to the same region in space but with orthogonal polarizations. Depending on the location of the vehicle and particular applications, operating all of the antennas may not provide the optimal result. Accordingly, it is desirable to provide mobile active and adaptive antenna arrays.

SUMMARY

In one exemplary embodiment, a method of controlling active and adaptive antenna arrays includes processing information to determine one or more areas of interest for subsequent transmission, and selecting one or more antennas among a set of available antennas in different locations of a vehicle to perform the subsequent transmission. Each of the one or more antennas includes one or more antenna elements. The method also includes assigning a magnitude and phase for the subsequent transmission by each of the one or more antenna elements of each of the one or more antennas.

In addition to one or more of the features described herein, the assigning the magnitude and phase includes ensuring uncorrelated transmission from each of the one or more antennas.

In addition to one or more of the features described herein, two or more antennas among the set of available antennas are selected to perform the subsequent transmission and forming an array of at least two of the two or more antennas.

In addition to one or more of the features described herein, the assigning the magnitude and phase includes ensuring uncorrelated transmission from the array of the at least two of the two or more antennas and others of the two or more antennas.

In addition to one or more of the features described herein, the processing the information includes processing signals received by each of the set of available antennas.

In addition to one or more of the features described herein, the processing the information further includes determining highest signal strengths among the signals received by each of the set of available antennas.

In addition to one or more of the features described herein, the processing the information includes processing sensor data from one or more sensors of the vehicle or vehicle data from one or more vehicle systems of the vehicle.

In addition to one or more of the features described herein, the processing the information further includes determining the one or more areas of interest based on the sensor data indicating a location of a highly reflective object to avoid for the subsequent transmission.

In addition to one or more of the features described herein, the processing the information further includes determining the one or more areas of interest based on the sensor data indicating an object to track.

In addition to one or more of the features described herein, the processing the information further includes determining the one or more areas of interest based on the vehicle data indicating a direction of travel of the vehicle.

In another exemplary embodiment, a system to control active and adaptive antenna arrays in a vehicle includes a set of available antennas of a radio frequency (RF) system. The set of available antennas is located in different locations of the vehicle and the RF system is a radar system or a cellular communication system of the vehicle. A processor processes information to determine one or more areas of interest for subsequent transmission, and select one or more antennas among the set of available antennas to perform the subsequent transmission. Each of the one or more antennas includes one or more antenna elements. The processor assigns a magnitude and phase for the subsequent transmission by each of the one or more antenna elements of each of the one or more antennas.

In addition to one or more of the features described herein, the processor assigns the magnitude and phase to ensure uncorrelated transmission from each of the one or more antennas.

In addition to one or more of the features described herein, the processor selects two or more antennas among the set of available antennas to perform the subsequent transmission and forms an array of at least two of the two or more antennas.

In addition to one or more of the features described herein, the processor assigns the magnitude and phase to ensure uncorrelated transmission from the array of the at least two of the two or more antennas and others of the two or more antennas.

In addition to one or more of the features described herein, the information includes signals received by each of the set of available antennas.

In addition to one or more of the features described herein, the processor determines highest signal strengths among the signals received by each of the set of available antennas to select the one or more antennas among the set of available antennas to perform the subsequent transmission.

In addition to one or more of the features described herein, the information includes sensor data from one or more sensors of the vehicle or vehicle data from one or more vehicle systems of the vehicle.

In addition to one or more of the features described herein, the processor determines the one or more areas of interest based on the sensor data indicating a location of a highly reflective object to avoid for the subsequent transmission.

In addition to one or more of the features described herein, the processor determines the one or more areas of interest based on the sensor data indicating an object to track.

In addition to one or more of the features described herein, the processor determines the one or more areas of interest based on the vehicle data indicating a direction of travel of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As previously noted, the radar system or cellular communication system of a vehicle may be one of several sensors used to enhance vehicle operation. Data obtained with the radar system may be processed to perform object detection and other applications that facilitate or enhance driver warning, autonomous driving, and other vehicle systems. The cellular communication system facilitates communication of voice, data, and streaming video to and from the vehicle. In certain circumstances (e.g., an object to be monitored is on one side of the vehicle, a subset of antennas is blocked by a building, a cellular base station to be used is on one side of the vehicle), transmitting from every antenna is unnecessary or sub-optimal.

Embodiments of the systems and methods detailed herein relate to dynamically selecting the antennas and corresponding radiation patterns for transmission. Specifically, a controller may select a subset of the available antennas to transmit. In addition, the controller may form one or more antenna arrays from the antennas that are selected for transmission. The radiation pattern transmitted by each antenna and, thus, each array is specified to result in the transmission of uncorrelated patterns. The radiation pattern refers to the directional or angular dependence of radio waves. For explanatory purposes, an RF system is discussed with respect to the dynamic antenna and radiation pattern selection. This RF system may be the radar system that is one of the sensors of the vehicle or may be a cellular communication system used by vehicle systems such as, for example, the infotainment system.

Figure 1:
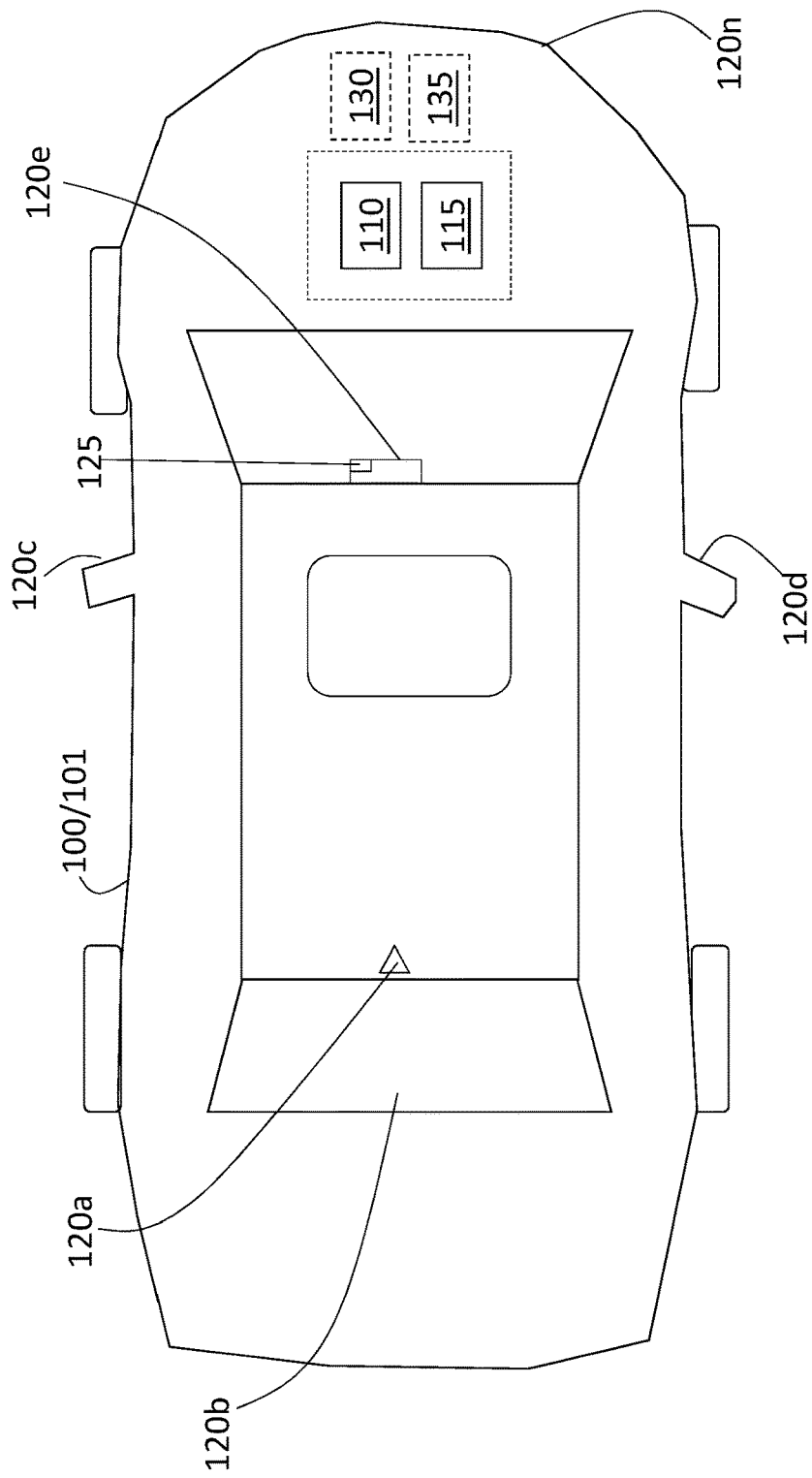
FIG. 1 is a block diagram of a mobile active and adaptive antenna array system in a vehicle according to one or more embodiments.

In accordance with an exemplary embodiment, FIG. 1 is a block diagram of a mobile active and adaptive antenna array system in a vehicle 100. The vehicle 100 in the exemplary embodiment is an automobile 101. The automobile 101 includes antennas 120a through 120n (generally referred to as 120) in various locations. For example, antennas 120b and 120e are mounted on the rear windshield and front windshield, respectively. Antennas 120c and 120d are mounted on the rearview mirrors. While some exemplary locations are shown in FIG. 1, antennas 120 may be mounted in any number of locations (e.g., dashboard, door trims, partitions) of the vehicle 100. Each antenna 120 may include one or more antenna elements 125. The radiation pattern transmitted by each antenna element 125 of the antenna 120 determines the radiation pattern transmitted by the antenna 120. Additional control over the transmitted radiation pattern may be achieved by adjusting the amplitude and phase shift of the transmissions.

The RF system includes a controller 110 that is detailed with reference to FIG. 2 and a radio layer 115 that is detailed with reference to FIG. 3. While the controller 110 and radio layer 115 are shown together in FIG. 1, both the controller 110 and radio layer 115 include multiple components. For example, the radio layer 115 includes a set of components (transceiver section 240, FIG. 2) that corresponds with each antenna 120. Thus, the controller 110 and radio layer 115 may be distributed in different parts of the vehicle 100. Other sensors 130 or vehicle systems 135 may be coupled to or otherwise in communication with the controller 110. The other sensors 130 may include a camera or lidar system, for example. The vehicle systems 135 may include an autonomous driving system, braking system, steering system, or warning system that sends and receives messages to and from other vehicles 100, pedestrians, or infrastructure. Information from the other sensors 130 or from the vehicle systems 135 may be used by the controller 110 to determine which antennas 120 to use for transmission.

Figure 2:
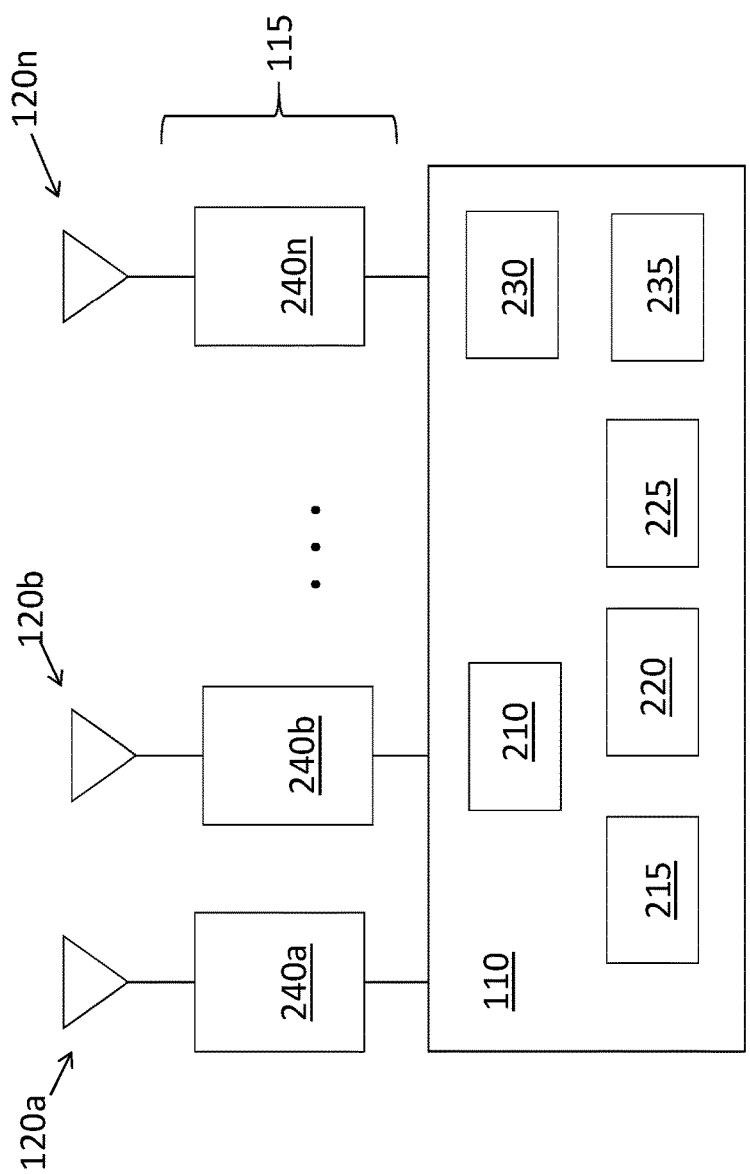
FIG. 2 is a block diagram of the mobile active and adaptive antenna array system according to one or more embodiments.

FIG. 2 is a block diagram of the mobile active and adaptive antenna array system according to one or more embodiments. As discussed with reference to FIG. 1, the system includes a controller 110, radio layer 115, and antennas 120. The radio layer 115 includes a transceiver section 240a through 240n (generally referred to as 240) corresponding with each antenna 120. The controller 110 includes processing circuitry that may include a field programmable gate array (FPGA) 210, a digital signal processing (DSP) circuit 215, a processor 220 (shared, dedicated, or group) and memory 225 that executes one or more software or firmware programs, a combinational logic circuit, and/or other suitable components that provide the described functionality. The controller 110 may also include a calibration processor 230 and clock 235. Each time the controller 110 changes the selection of which antennas 120 transmit, a calibration process must be completed or information obtained from a previous calibration of the particular configuration (e.g., performed by the manufacturer) must be used. The controller 110 includes power conditioning and other known components of an RF system that are not detailed herein because they are not relevant to the determination of which antennas 120 should transmit at a given time. Factors used in the determination are detailed with reference to FIG. 4.

Figure 3:
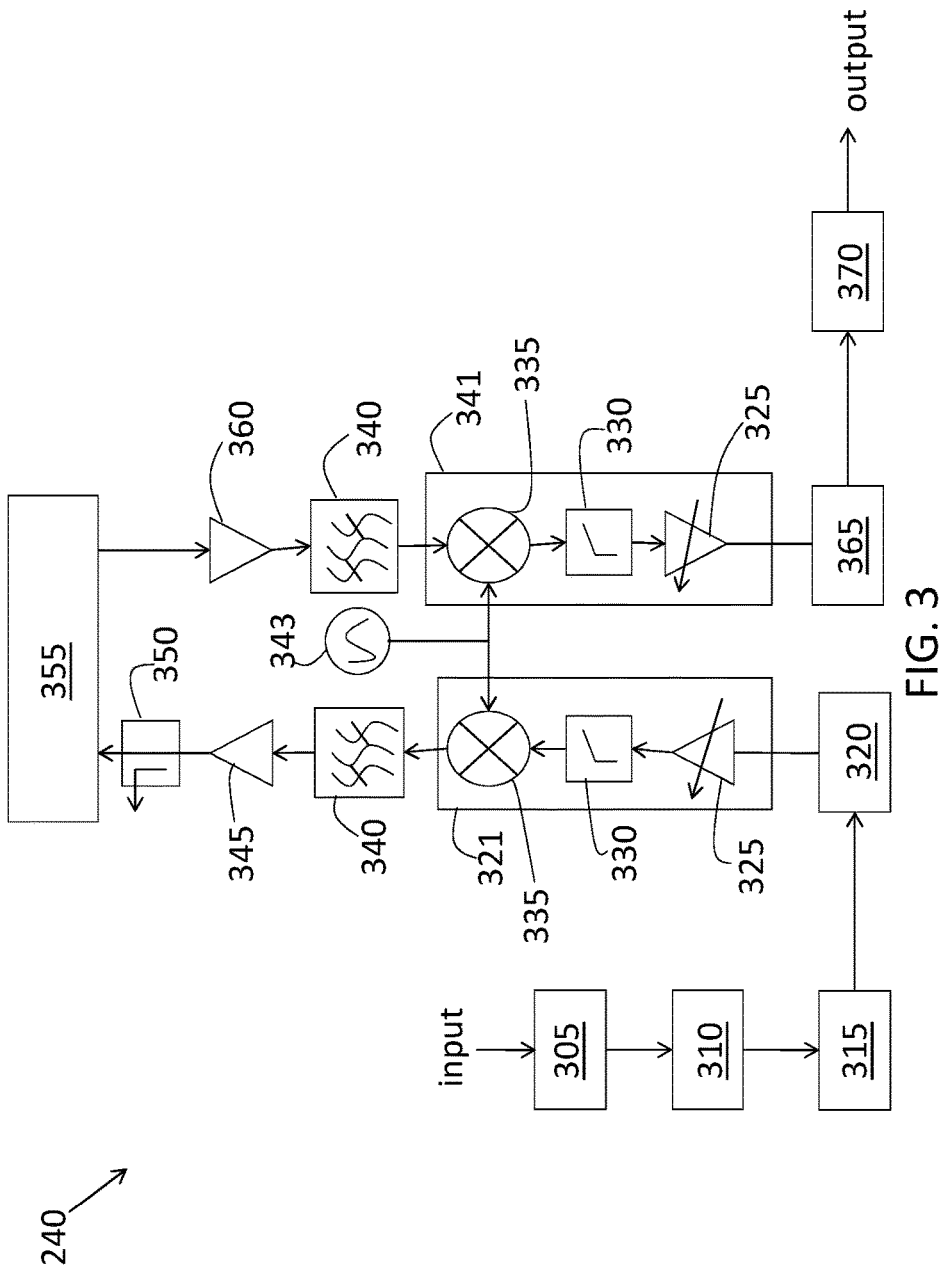
FIG. 3 is a block diagram of a transceiver section of the radio layer according to an exemplary embodiment.

FIG. 3 is a block diagram of a transceiver section 240 of the radio layer 115 according to an exemplary embodiment. The transceiver section 240 processes the signal for transmission and processes the received signal, as well. A digital up-converter (DUC) 305 scales the frequency of the input signal. A crest factor reduction unit 310 produces signals with a reduced modulation envelope, which is needed in orthogonal frequency-division multiplexing (OFDM), for example. A digital pre-distortion unit 315 increases linearity and reduces distortion of an amplifier of the incoming signal. A digital-to-analog converter (DAC) 320 converts the signal from the digital pre-distortion unit 315 to an analog signal for up-conversion in the up-converter 321. The signal coming into the up-converter 321 may be an intermediate frequency (IF) signal on the order of 20 megahertz, for example.

The up-converter 321 includes a pre-amplifier voltage controlled oscillator (VCO) 325, a low pass filter (LPF) 330, and a mixer 335 that mixes the signal from the low pass filter 330 with a reference signal 343. A bandpass filter (BPF) 340 filters the output of the up-converter 321. A power amplifier (PA) 345 amplifies the bandpass filtered signal and provides it to a duplexer 355 to be transmitted via the antenna 120. A signal tap 350 facilitates obtaining the output of the PA 345 for calibration.

On the receive side, the signal received by the antenna 120 is provided through the duplexer 355 to a low noise amplifier (LNA) 360. The LNA 360 output is filtered by a BPF 340 before being down converted by a down-converter 341. The down-converter 341 includes a mixer 335 that mixes the BPF 340 output with the reference signal 343, a LPF 330 and a VCO 325. An analog-to-digital converter (ADC) 365 converts the output of the down-converter 341 to a digital signal that is provided to the digital down converter (DDC) 370, which provides an output for further signal processing. As discussed with reference to FIG. 4, the controller 110 controls the input to the DUC 305 to control whether a given transceiver section 240 transmits, as well as the magnitude and phase of the transmission.

Figure 4:
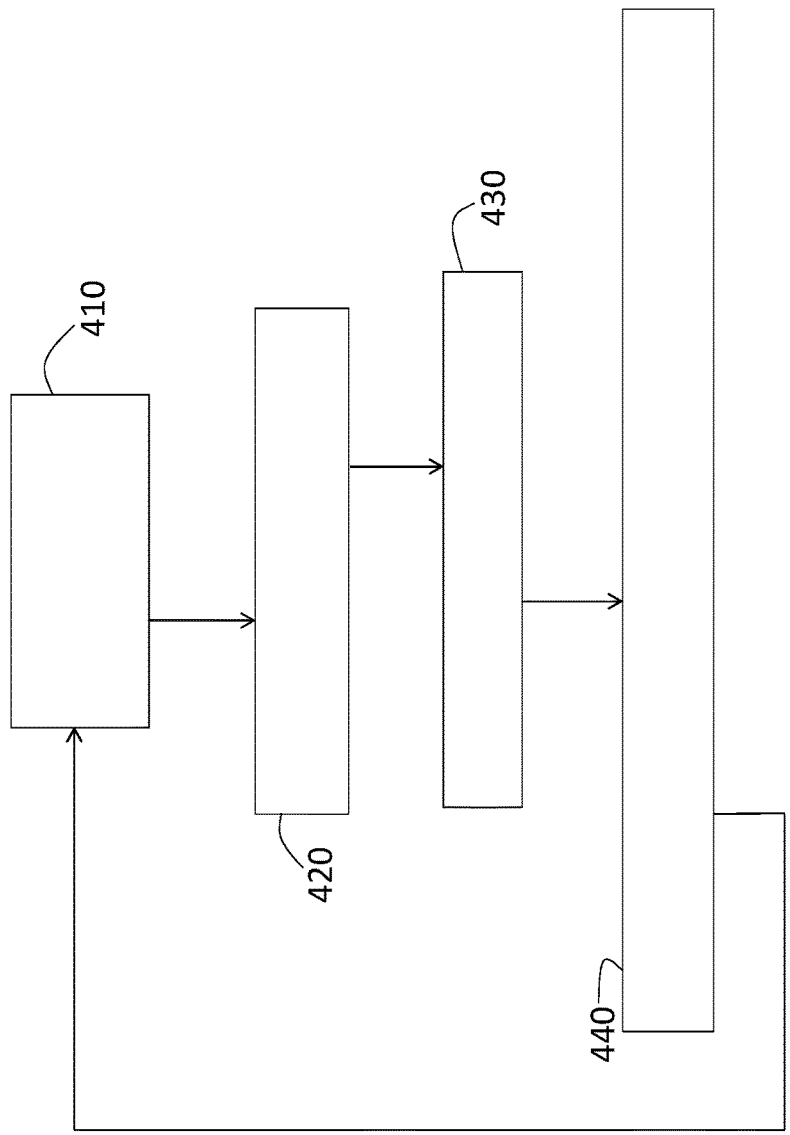
FIG. 4 is a process flow of a method of controlling active and adaptive antenna arrays according to one or more embodiments.

FIG. 4 is a process flow of a method of controlling active and adaptive antenna arrays according to one or more embodiments. At block 410, processing received information results in the controller 110 determining one or more areas of interest for transmission. Receiving information may include receiving signals with all the available antennas 120 of the vehicle 100. In this case, the controller 110 may use the signal strengths received by each of the antennas 120 to determine the strongest links with respect to the desired illumination target (e.g., cellular tower when the RF system is a cellular communication system, radar target when the RF system is a radar sensor system) based on the vehicle location and orientation and use these links to determine the areas of interest for subsequent transmission. The controller 110 may determine the areas such that only the antennas 120 associated with the strongest links are selected to transmit (at block 420), for example. A specified number of antennas 120 or antennas 120 receiving signals with a signal strength exceeding a specified threshold may be selected by the controller 110, for example.

The received information may alternately or additionally include information from other sensors 130 or vehicle systems 135. The areas of interest may also be determined based on an object detected by a camera or lidar system, which are sensors 130 of the vehicle 100. For example, if a camera determines that transmissions from one side of the vehicle 100 are blocked by a building or other highly reflective object, the antennas 120 on that side of the vehicle 100 may not be selected for transmission (at block 420). As another example, the controller may select antennas 120 based on a line of sight to an object of interest. For example, when the lidar system identifies an object, the area of the object may be determined as the area of interest for transmission. As such, the controller 110 may select only the antennas 120 with a line of sight to the object to transmit in order to track the object. The areas of interest may be determined based on an indication of vehicle movement provided by a vehicle system 135. For example, based on the WSS or IMU indicating a speed over a specified threshold, the controller 110 may select antennas 120 to increase visibility and, thus, warning time in the direction of travel.

At block 420, determining the antenna combination includes the controller 110 selecting one or more of the antennas 120 to transmit according to the received information. The controller 110 may additionally assign antennas 120 for arrays, at block 430. That is, the controller 110 may form one or more arrays by assigning two or more of the selected antennas 120 to be part of an array or create more than one array of two or more antennas 120.

At block 440, assigning magnitude and phase of the transmission by each antenna element 125 of each antenna 120 (selected at block 420) facilitates the controller 110 controlling the radiation pattern that is transmitted. The antennas 120 that are part of the array are assigned radiation patterns to obtain a desired combined radiation pattern from the antennas 120 of the array. When an antenna 120 includes more than one antenna element 125, each antenna element 125 is assigned the magnitude and phase that facilitates the antenna 120 and, consequently, the array having the desired radiation pattern. The radiation pattern selected by the controller 110 may be based on a two-step process. As a first step, the contribution of each element 125 of each antenna 120 to the overall radiation pattern may be identified based on simulations. Once the antennas 120 are mounted on the vehicle 100 (e.g., once for each vehicle model), measurements may be obtained as a second step. These measurements of radiation pattern may be obtained in an anechoic chamber and provided to the controller 110. The controller 110 can then compute the antennas 120 and elements 125 needed. In addition, the controller 110 may adjust the magnitude and phase assigned to each element 125 to achieve the desired radiation pattern.

On the receive side, all of the antennas 120, rather than only the antennas 120 selected for transmission may receive signals. The processing of those received signals is done according to known processes and may be used as discussed with reference to block 410. As FIG. 4 indicates, the processes performed by the controller 110 to select antennas 120 for transmission are repeated and may be done continuously, periodically, or based on an event indicated by the received information (at block 410).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of controlling active and adaptive antenna arrays, the method comprising:
   processing information to determine one or more areas of interest for subsequent transmission;
   selecting one or more antennas among a set of available antennas in different locations of a vehicle to perform the subsequent transmission, wherein each of the one or more antennas includes one or more antenna elements; and
   assigning a magnitude and phase for the subsequent transmission by each of the one or more antenna elements of each of the one or more antennas.

2. The method according to claim 1, wherein the assigning the magnitude and phase includes ensuring uncorrelated transmission from each of the one or more antennas.

3. The method according to claim 1, further comprising selecting two or more antennas among the set of available antennas to perform the subsequent transmission and forming an array of at least two of the two or more antennas.

4. The method according to claim 3, wherein the assigning the magnitude and phase includes ensuring uncorrelated transmission from the array of the at least two of the two or more antennas and others of the two or more antennas.

5. The method according to claim 1, wherein the processing the information includes processing signals received by each of the set of available antennas.

6. The method according to claim 5, wherein the processing the information further includes determining highest signal strengths among the signals received by each of the set of available antennas.

7. The method according to claim 1, wherein the processing the information includes processing sensor data from one or more sensors of the vehicle or vehicle data from one or more vehicle systems of the vehicle.

8. The method according to claim 7, wherein the processing the information further includes determining the one or more areas of interest based on the sensor data indicating a location of a highly reflective object to avoid for the subsequent transmission.

9. The method according to claim 7, wherein the processing the information further includes determining the one or more areas of interest based on the sensor data indicating an object to track.

10. The method according to claim 7, wherein the processing the information further includes determining the one or more areas of interest based on the vehicle data indicating a direction of travel of the vehicle.

11. A system to control active and adaptive antenna arrays in a vehicle, the system comprising:
a set of available antennas of a radio frequency (RF) system, wherein the set of available antennas is located in different locations of the vehicle and the RF system is a radar system or a cellular communication system of the vehicle; and
a processor configured to process information to determine one or more areas of interest for subsequent transmission, select one or more antennas among the set of available antennas to perform the subsequent transmission, wherein each of the one or more antennas includes one or more antenna elements, and assign a magnitude and phase for the subsequent transmission by each of the one or more antenna elements of each of the one or more antennas.

12. The system according to claim 11, wherein the processor is further configured to assign the magnitude and phase to ensure uncorrelated transmission from each of the one or more antennas.

13. The system according to claim 11, wherein the processor is further configured to select two or more antennas among the set of available antennas to perform the subsequent transmission and forms an array of at least two of the two or more antennas.

14. The system according to claim 13, wherein the processor is further configured to assign the magnitude and phase to ensure uncorrelated transmission from the array of the at least two of the two or more antennas and others of the two or more antennas.

15. The system according to claim 11, wherein the information includes signals received by each of the set of available antennas.

16. The system according to claim 15, wherein the processor is further configured to determine highest signal strengths among the signals received by each of the set of available antennas to select the one or more antennas among the set of available antennas to perform the subsequent transmission.

17. The system according to claim 11, wherein the information includes sensor data from one or more sensors of the vehicle, or vehicle data from one or more vehicle systems of the vehicle.

18. The system according to claim 17, wherein the processor is further configured to determine the one or more areas of interest based on the sensor data indicating a location of a highly reflective object to avoid for the subsequent transmission.

19. The system according to claim 17, wherein the processor is further configured to determine the one or more areas of interest based on the sensor data indicating an object to track.

20. The system according to claim 17, wherein the processor is further configured to determine the one or more areas of interest based on the vehicle data indicating a direction of travel of the vehicle.

* * * * *